United States Patent [19]

Schmidt

[11] 4,396,503

[45] Aug. 2, 1983

[54] METHOD AND DEVICE FOR COATING ELEMENTS AND SCREEN ELEMENTS MADE THEREBY

[75] Inventor: Gerhard Schmidt, Ettlingen, Fed. Rep. of Germany

[73] Assignee: Hein Lehmann AG, Dusseldorf, Fed. Rep. of Germany

[21] Appl. No.: 291,882

[22] Filed: Aug. 10, 1981

[51] Int. Cl.³ .......................... B07B 1/12; B29C 1/12; B29C 13/00

[52] U.S. Cl. .................................... 209/393; 118/406; 118/505; 249/176; 249/183; 264/261; 264/263; 264/264

[58] Field of Search .............. 264/259, 267, 261, 299, 264/264, 313, 334, 263; 425/DIG. 44; 249/176, 122, 175, 177, 183; 209/233, 234, 393–395, 397–399; 428/134, 137; 118/301, 406, 504, 505; 427/243, 247, 282

[56] References Cited

U.S. PATENT DOCUMENTS

| | | | |
|---|---|---|---|
| 31,187 | 1/1861 | Neill | 249/122 |
| 1,117,897 | 11/1914 | Paget et al. | 209/293 |
| 2,037,545 | 4/1936 | Sexton | 249/176 |
| 3,018,891 | 1/1962 | Bergstrom | 209/399 |
| 3,021,241 | 2/1962 | Schneiderman et al. | 264/275 |
| 3,695,573 | 10/1972 | Huffaker | 249/176 |
| 3,937,438 | 2/1976 | Fox et al. | 264/313 |
| 3,972,974 | 8/1976 | Pico | 264/267 |
| 4,113,626 | 9/1978 | Detcher | 209/393 |
| 4,115,507 | 9/1978 | Pico | 264/267 |
| 4,250,038 | 2/1981 | Dryden | 209/393 |

Primary Examiner—Willard E. Hoag
Attorney, Agent, or Firm—Allison C. Collard; Thomas M. Galgano

[57] ABSTRACT

In accordance with the inventive method, a one-sided coated element, in particular a screen element, is provided with a bonding agent after being cleaned. Subsequently, form elements are inserted into the openings of the elements from the rear side thereof which completely fill the openings and extend therethrough. Thereafter, the coating is applied in a lesser thickness than the height of the protruding form elements. This assures that, with a comparably thick coating, openings of a predetermined geometry are created. For this purpose, a device is preferably used having bars which consist of adjacent, successive tapered, pyramid- or horizontal prism-like form elements. The form elements consist of an elastic material which taper into a sharp pointed edge. Thereby, the form elements may be easily installed and removed and the coating runs off the form elements during application, so that the openings are not covered up by the coating material. In such a manufactured screen element, the openings are formed by parallel running profile wires which are connected with each other by transverse ribs. The coating is applied in comparable large thicknesses on the operating face of the profile wires.

12 Claims, 2 Drawing Figures

METHOD AND DEVICE FOR COATING ELEMENTS AND SCREEN ELEMENTS MADE THEREBY

The invention relates to a method and device for coating elements, as well as a screen element made in accordance therewith having a multiplicity of openings for sorting, classifying and/or separating goods, wherein the openings are closed by form pieces, and wherein a bonding agent and thereafter a protective agent is applied in one or a plurality of layers onto the surface of the elements.

Such a method is used to coat elements with a protective coating, so as to reduce corrosion. Therefore, it is widely used to protect screen bottoms, screen troughs and centrifuge baskets made of welded or intertwined screen profile or section wires which form slots.

A method for powder coating workpieces is known from German Auslegeschrift 25 26 185. Therein, bores, thread openings and the like, are covered or plugged up before a watery pretreatment. Thereby, the plugs, hoses or screws which are being used are inserted from the side of the surface which is to be coated. The thickness of the applied coating is comparably low.

The sealing parts must be removed upwardly after coating. Thereby, there is a possibility that the coating will be removed or torn off at least in the area of the openings. This is particularly true because the coating is applied and adheres to the sealing elements in the same manner as on the surfaces of the element to be treated. With a greater coating thickness, this tendency would also increase. Furthermore, sealing elements are often used wherein the surface of the also coated element which protrudes from the screening element is larger, i.e., has a larger cross section, than its base which extends into the opening of the screening element. If the screening element to be coated has a plurality of openings, the application of the coating is considerably impaired because the free access to the surface to be coated is reduced. Furthermore, the danger exists that the sealing elements, when they are pressed into the openings as suggested, cause very small recesses or steps in the flow-through direction of the openings. Such an element would not be suitable for classifying and/or separating goods, since deposits would form which would rapidly plug up the openings.

Furthermore, German Auslegeschrift 25 26 185 does not afford a desired and reproducible opening geometry in the area of the coating. The described method merely tries to prevent a penetration of coating material into the openings.

In another known method, the correspondingly pretreated element is immersed into a liquid-protective agent which subsequently hardens and constitutes the protective coating. However, in elements which have a plurality of openings, the openings become clogged, especially when larger coating thicknesses were required and/or if the openings had a very small cross section. Furthermore, it is almost impossible to obtain openings of a predetermined dimension after coating.

Therefore, such coating methods are not being used any longer and the screen bottoms, screen molds or centrifuge baskets are made of flexible material, for example, polyurethane. Despite the reinforcements which are being used, so as to obtain the required bending resistance or flexural stiffness, the ribs between the openings must be widened which causes a disadvantageous reduction of the open screen face.

It is therefore an object of the invention to provide a method of the aforementioned type whereby supportable and bend-resistant elements may be coated which have a large open face, wherein the layer may be applied in a comparably large thickness and wherein openings may be obtained with exactly predetermined dimensions.

It is also an object of the invention to provide a device for carrying out the method in a simple and economical manner.

Certain of the foregoing and related objects are obtained by a method of the aforementioned type, which includes the step of inserting the form elements into and through the openings of the element from the side opposite to the operating face of the element to be coated, such that they protrude outwardly beyond the operating face, and applying the protective agent only onto the operating face of the element in a thickness which is less than the protruding height of the form elements.

Thereby, a simple method is provided with which supportable and bend-resistant or resilient elements may be used for the classification and/or separation of goods whereby these elements are coated despite the fact that they contain a plurality of openings and a large open face. Thereby, the coating does not adhere on the corresponding surfaces of the form pieces or adhere only in a very minute amount. Since the form pieces may be removed from the elements through the uncoated side, the edges of the openings in the area of the coating will no longer be damaged or impaired in any other way. The coating thickness is selectable in wide limits. The openings can be maintained free and reproducible with a predetermined geometry.

It is particularly advantageous that a protecting agent be applied in a thickness of at least 1 mm and, preferably in a thickness of at least 2.5 mm. In this manner, a protective layer is created which has a large absorption capacity with respect to shock-like stress or loads. At the same time, the stress or load peaks are reduced which results in a reduced wear and results in an improved service life. Very often it is advantageous to have a 4 mm thick or an even thicker protective coating.

For carrying out the inventive method with form elements which are fitted to the openings of the elements to be coated, it has been shown to be particularly advantageous to use form elements which have a tapered, pyramid-like or saddle roof-like shape and which include mold faces having an angle of inclination which is greater than the angle of inclination of the sidewalls of the opening which comes into engagement with the mold faces, whereby the mold faces engages linearly and sealingly on the upper edge of the openings. This prevents the protective agent from penetrating into the openings of the elements in an uncontrollable manner during the application of the agent, when it has not yet hardened, set or netted. The form elements can then be easily removed. The openings of the elements are not unduly or uncontrollably reduced.

In order to obtain a free surface of the protective agent which became the protective coating, the ends of the form elements which penetrate the openings of the elements to be coated are sharp edged and pointed. This also facilitates the removal of the form elements.

Very suitable and often reusable form elements consist of elastic, moldable plastic material which is also temperature resistant up to at least about 90° C., for example, a polyurethane or silicon rubber. The polyurethane iteself may be repellant with respect to the protective coating and/or the form elements must be treated with a release compound before applying the protective agent.

An easily operable device is provided wherein the form elements are arranged in one and/or a plurality of toothed rack-like bars. This is particularly true for saddle roof-like form elements used for slot-like openings in the element to be coated.

It had been shown to be very advantageous if the inventive device is provided with a divisible frame having form ribs which engages snugly on the element to be coated and extends thereabove. The form elements or the bars may be easily removed if they are provided with recesses on their side faces and/or lower faces, e.g., dove-tail undercut grooves.

One embodiment of the inventive method is particularly suitable for making screen elements, in particular, screen bottoms wherein the element to be protected is provided with a plurality of parallel slot-forming profile wires or profile rods which have a trapezoidal-like cross section and which are connected with each other, e.g., by being welded together, by means of transverse ribs.

Other objects and features of the present invention will become apparent from the following detailed description when taken in connection with the accompanying schematic drawings which disclose several embodiments of the invention. It is to be understood that the drawings are designed for the purpose of illustration only and are not intended as a definition of the limits of the invention.

In the drawings, wherein similar reference characters denote similar elements throughout the several views.

Figure 1:
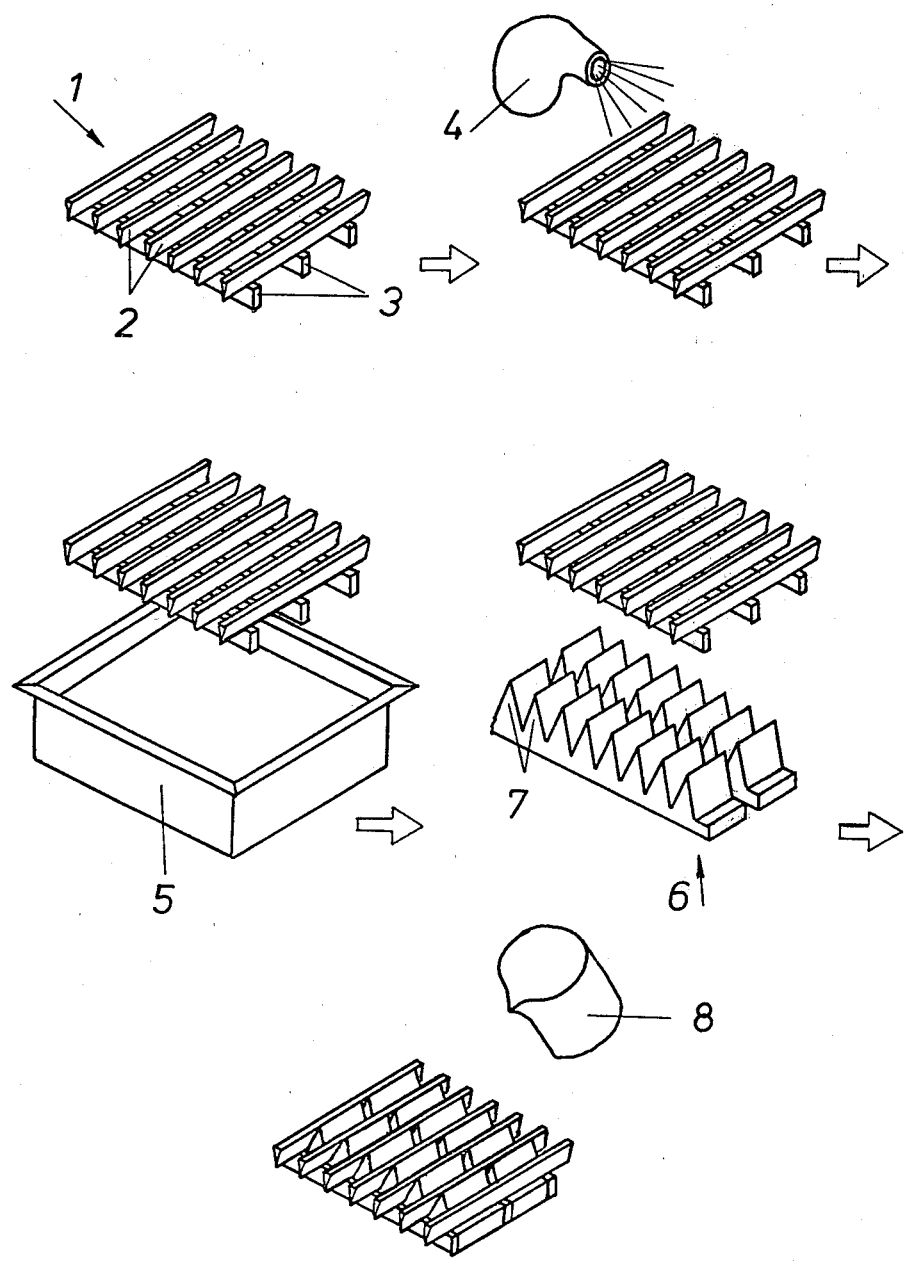
FIG. 1 illustrates the operating steps of the inventive method.

Referring now in detail to the drawings, FIG. 1 illustrates the essential operative steps of the inventive method for coating an element which has a plurality of openings which define a large open face. First of all, element 1 is made. The grill-like element, a so-called "welded slot screen" is created from a large number of parallel running openings, for example, slots between profile or streamlined wires 2 which are welded to each other by means of transversely-mounted rectangular ribs 3, i.e., rectangular with respect to profile wires 2. The profile wires 2, as well as the transverse ribs 3, have a trapezoidal-like cross section and are made of rustproof steel. They must be dimensioned for supportability only and not for wear. The slots must be made with a high degree of exactness; otherwise, undue complications arise when one wants to obtain openings with a desired geometry in a simple manner. The finished element 1 is cleansed and roughened, e.g., by sand blasting means 4 and is then treated with a suitable bonding agent 5 for effecting a durable connection between the element and the protective agent to be applied. For this purpose, the element may be sprayed (not shown) with the bonding agent 5 or may be immersed therein.

Thereafter, the toothed rack-like bar 6 composed of form elements 7 which assume a saddle- or roof gable-shape are inserted into the element from the side facing away from the operating face of the element 1 to be protected, i.e. from the rear side thereof. Form elements 7 penetrate the slots completely and extend somewhat beyond the face to be protected. They are introduced between transverse ribs 3.

Finally, the protective agent, in particular, a rapid curing polyurethane, is applied from a suitable source 8 in a thickness less than the protruding height of form elements 7, so that a protective coating 16 is provided with an almost smooth surface, preferably in a thickness of 4 mm or more. A suitable plastic material is manufactured and sold by Dupont, having an address of Wilmington, Del., which material is sold under the product name "Adiprene". After the protective agent forms a shape-maintaining protective layer 16, bars 6 are then removed. The coated element is especially suitable for being used in screen and filter installations, for example, as a screen bottom, screen trough or a centrifuge basket.

With the assistance of the inventive method, it is possible to coat, in a simple manner, plain or curved elements. Also, a subsequent coating of the elements is made possible without disassembling the elements. The protective agent may be applied in a comparable large thickness. The dimensions of the openings after coating may be easily adjusted to the intended use for the elements. Therefore, it is no longer required to use for each opening dimension another element or other form elements or bars, respectively. With a few basic types of elements and form elements or bars, many different opening geometries may be created. Only the protective coating thickness has to be varied. The larger the thickness of the coating, the smaller the finished opening will become, due to the pyramid-like or saddle roof-shaped form elements. The profile wires which do not have to be dimensioned for wear any longer may therefore be designed more economically and thinner and therefore a significant weight saving may be achieved.

Figure 2:
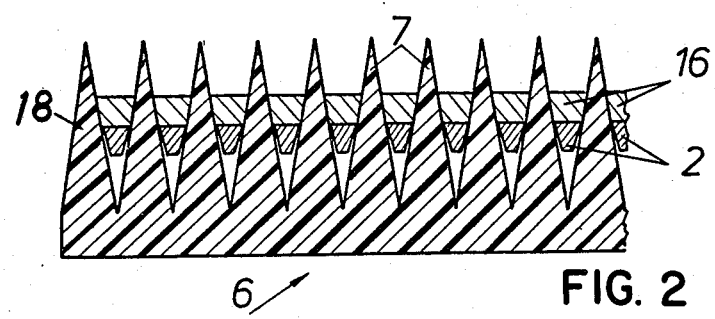
FIG. 2 is a fragmentarily-illustrated longitudinal sectional side view of the inventive device in a mounted position.

FIG. 2 shows a longitudinal side view of an inventive device in sectional view. The device is provided with form elements 7 which are combined into a unitary toothed rack-like bar 6. The bar consists of elastic, moldable plastic or silicon rubber which is also temperature resistant up to at least about 90° C. It can be easily removed and reused very often. The successively-arranged form elements 7 have a saddle roof-like shape and are parallel with respect to each other and are spaced to correspond to the spacing or the center distance of the slots of the elements to be coated. An additional form element 18 constitutes the end piece and eliminates a form element rib of a mold frame which would otherwise be required. The element to be coated again consists of welded together profile wires 2 and rectangular ribs 3 which run in a transverse direction thereto. The slot formed between profile wires 2 is substantially larger than the opening width of the finally obtained slot. The size of the opening of the final slot may be varied by a different thickness of the protective coating layer 16. The ends of form elements 7 which penetrate the openings of the elements are sharp edged and pointed.

Figure 3:
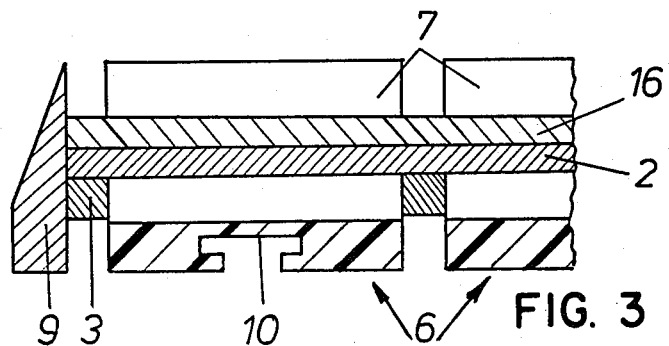
FIG. 3 is a fragmentarily-illustrated transverse sectional side view of the same device.

FIG. 3 illustrates a side sectional view of the same device; however, it is turned by about 90° with respect to the embodiment shown in FIG. 2. The width of he bar is adjusted to accommodate the distance between the transverse elements. The sides faces of the form elements or the bars facing the transverse elements are substantially positioned vertically with respect to the surface of the element. At the edge of the elements, wherein the form elements do not form a lateral protruding end piece, a mold rib 9 of a mold frame is in snug engagement therewith. The protruding transverse edge of mold rib 9 is also sharp edged and pointed. On the lower face of bars 6, a dove tail-like groove 10 is provided running in the longitudinal direction of the bar. Groove 10, on the one hand, facilitates the insertion of bar 6 and, on the other hand, simultaneously permits cooperation with a suitable tool to remove the element from the mold. Bars 6 may be pulled off from their smaller front face almost like an adhesive tape.

Figure 4:
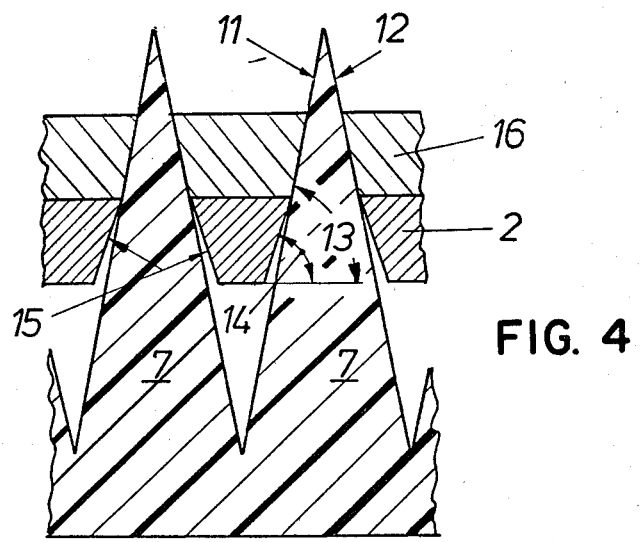
FIG. 4 is a fragmentarily-illustrated enlarged, longitudinal sectional view of a portion of the device shown in FIG. 2.

FIG. 4 illustrates an enlarged detail in a sectional view in accordance with FIGS. 2 and 3. Each of the form elements 7 has a saddle roof-like shape and is substantially formed by two form faces 11, 12 which are at an inclined angle with respect to each other and a lower face, thus resulting generally in a continuous isoceles triangle in its cross-sectional shape. The angle of inclination 13 which comes into engagement with the associated mold face 11 is larger than the angle of inclination 14 of element face 15. Thereby, form face 11, in cooperation with element face 15, seals the opening in this area completely. The liquid or flowable protective agent cannot penetrate into the opening during application. Thereby, only openings with the desired geometry are created. Also, bars 6 can be more easily removed. Furthermore, slight separating and manufacturing deviations in the elements 1 and bars 6 or the form elements 7 may be compensated for. As previously mentioned, the thickness of the protective layer is preferably at least 4 mm.

Thus, while only several embodiments of the present invention have been shown and described, it will be obvious that many changes and modifications may be made thereunto, without departing from the spirit and scope of the invention.

What is claimed is:

1. In a method for coating elements having a multiplicity of openings for sorting, classifying and/or separating goods of the type wherein a bonding agent and thereafter a protective agent is applied at least once onto the surface of the element to be coated and wherein form elements are inserted into the element openings, each opening of which, in cross section, has opposing front edges and opposing rear edges, joined by tapered wall faces, the improvement comprising the steps of:
    providing said form elements with tapered sidewalls, the angle of inclination of each of which is greater than the angle of inclination of the associated opening tapered wall face;
    inserting said form elements into and through said openings of said element from the side opposite to the operating face of the element to be coated, such that they protrude outwardly beyond said operating face and said front edges of said openings and wherein said sidewalls thereof engage in a linearly and sealing manner the front edges of said openings; and
    applying said protective agent only onto said operating face of said element in a thickness which is less than the protruding height of said form elements, said linear sealing engagement of said sidewalls of said form elements with said front edges of said openings, preventing said protective agent from seeping into said openings.

2. The method according to claim 1, wherein said protective agent is applied in a thickness of at least 1 mm.

3. The method according to claim 1, wherein said protective agent is applied in a thickness of at least 2.5 mm.

4. A screen element made according to claim 1, comprising a plurality of parallel-slot forming profile wires having a trapezoidal-like cross section which are connected with each other by means of transverse ribs.

5. A flexible form for coating elements having a multiplicity of openings, each opening of which, in cross section, has opposing front edges and opposing rear edges, joined by tapered wall faces, comprising:
    a multiplicity of form elements which are configured and dimensioned to fit into said openings, said form elements having tapered sidewalls, the angle of inclination of which is greater than the angle of inclination of a tapered wall face defining at least in part one of said openings so that when said form elements are inserted into said openings of said elements from the rear side thereof, said sidewalls engage in a linearly and sealing manner the front edges of said openings so as to prevent coating material from seeping into said opening, at least some of said form elements being interconnected so as to have a generally sawtooth configuration, with each of said elements terminating in a relatively narrow edge having a substantial traverse length.

6. The flexible form according to claim 5, wherein said form elements are combined to form at least one toothed rack-like bar.

7. The flexible form according to claim 5, wherein said form elements are provided with recesses which facilitate their removal from a mold.

8. The flexible form according to claim 7, wherein said recesses comprise dove tail-like undercut grooves formed in the lower face of said elements.

9. The flexible form according to claim 5, wherein said form elements have ends which protrude from said openings of said elements which taper into a sharp pointed edge.

10. The flexible form accordingly to claims 9, wherein said form elements comprise an elastomer which is temperature resistant to at least about 90° C.

11. The flexible form according to claim 10 wherein said elastomer is a synthetic polymer.

12. The flexible form according to claim 10 wherein said elastomer is silicone rubber.

* * * * *